May 12, 1970
I. ERLICHMAN
3,511,152
FILM ADVANCING APPARATUS
Filed March 18, 1968
2 Sheets-Sheet 1
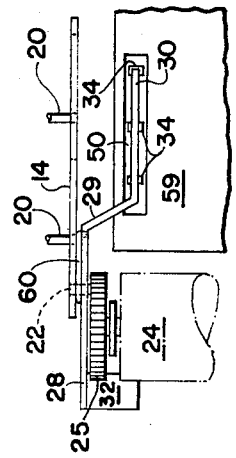
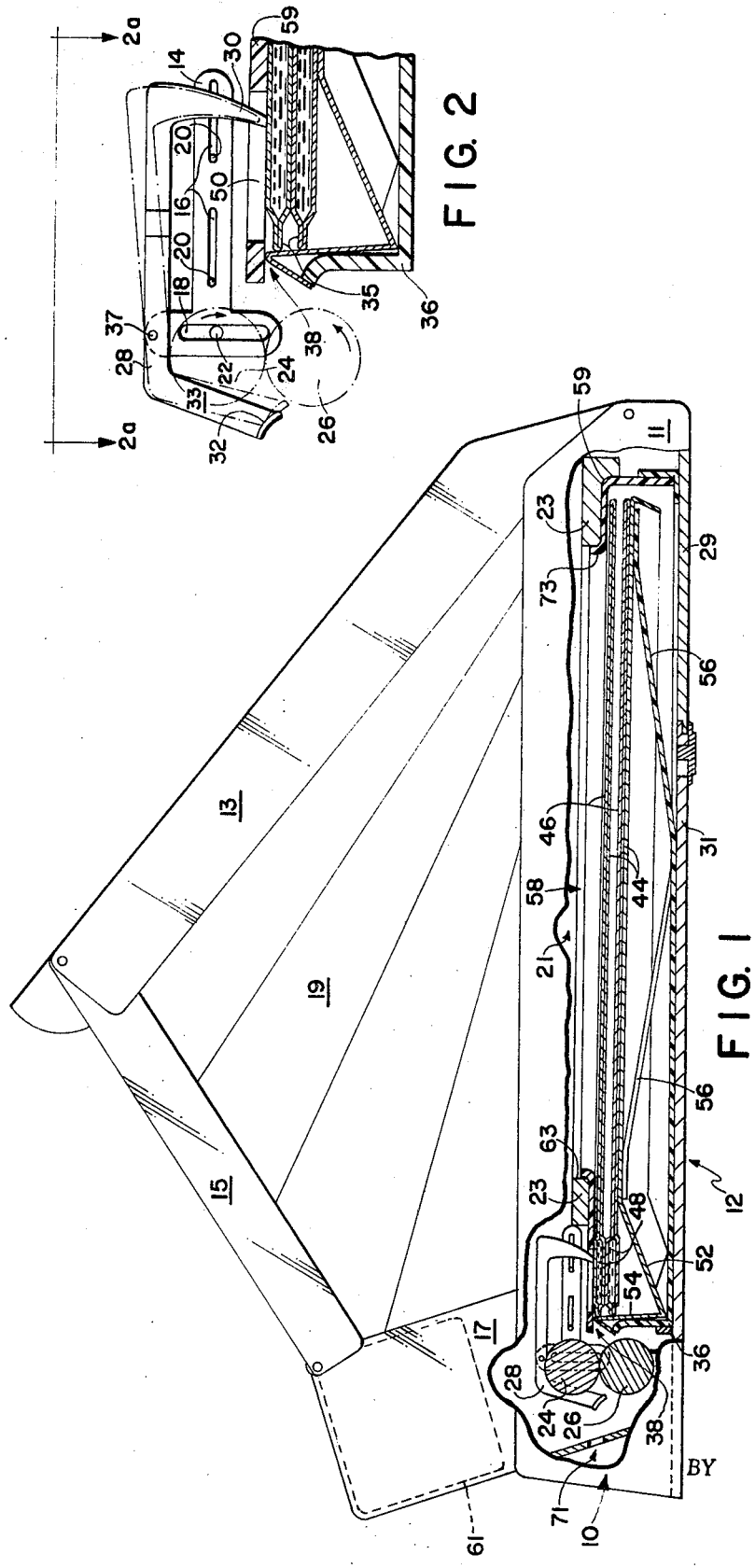
INVENTOR.
Irving Erlichman
BY Brown and Mikulka
and
Alfred E. Corrigan
ATTORNEYS May 12, 1970  I. ERLICHMAN  3,511,152

FILM ADVANCING APPARATUS

Filed March 18, 1968  2 Sheets-Sheet 2

INVENTOR.
Irving Erlichman
BY
Brown and Mikulka
and
Alfred E. Corrigan
ATTORNEYS United States Patent Office 3,511,152
Patented May 12, 1970

3,511,152
FILM ADVANCING APPARATUS
Irving Erlichman, Natick, Mass., assignor to Polaroid Corporation, Cambridge, Mass., a corporation of Delaware
Filed Mar. 18, 1968, Ser. No. 713,766
Int. Cl. G03b 17/52
U.S. Cl. 95—13    16 Claims

ABSTRACT OF THE DISCLOSURE

A self-developing camera including a pair of processing rollers and a reciprocating pick for engaging one of a stack of film units in a container and moving it into engagement with the rolls. The rolls rotate and the pick reciprocates continuously and simultaneously. An arm is connected to the pick for sensing the presence of the film unit in engagement between the rolls for preventing the pick from moving another film unit into the bite of the rolls until the previous film unit has moved from between the rolls.

---

The present invention is concerned with improvements in photographic apparatus such as cameras of the self-developing type adapted to be employed with a film assemblage or pack including a container housing a plurality of photosensitive elements or film units arranged in stacked relation and adapted to be exposed, in sequence, within the container and withdrawn therefrom following exposure. Subsequent to being withdrawn from the container, each film unit including, for an example, a photosensitive element and a superposed image-receiving element, is processed by moving the superposed elements between a pair of juxtaposed pressure-applying members, usually rolls, located within the photographic apparatus adjacent an opening in an end wall of the film container, in order to distribute a processing liquid between the superposed elements. Heretofore in apparatus of the foregoing type, the user of the apparatus has been required to manually feed the film units from the container, usually by grasping and pulling a leader which protrudes from the apparatus and is attached to a film unit. An object of the invention is to provide, in photographic apparatus of the type set forth above including driven processing rolls, means for automatically feeding successive film units from a container into the nip of the processing rolls.

Another object of the invention is to provide in photographic apparatus of the foregoing type including means for automatically moving a film unit from a film container to a position between a pair of pressure-applying members, means for preventing the withdrawal of another film unit until said first-mentioned film unit has passed from between said pressure-applying members.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is an elevation view, partially in section, of a film advancing apparatus embodying the invention shown in a camera with which the film advancing apparatus is adapted to be employed, the partial section being taken substantially along a line midway between the sides of the camera;

FIG. 2 is an enlarged view of the film advancing apparatus;

FIG. 2a is a view taken substantially along the line 2a—2a of FIG. 2;

Figure 3:
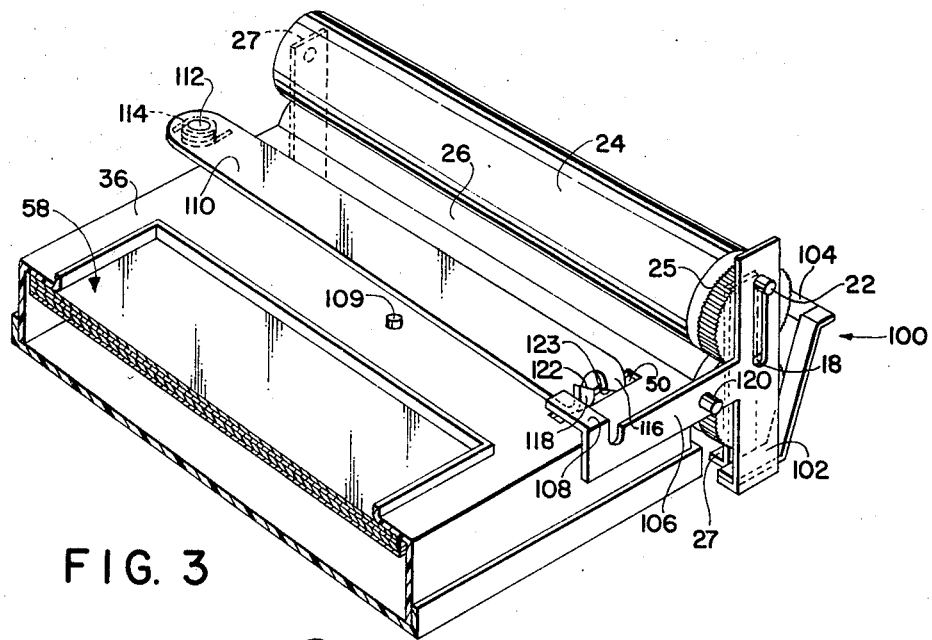
FIG. 3 is a perspective view, partially in section, of a modified film advancing apparatus.

Reference is now made to FIGS. 1, 2 and 2a of the drawings wherein is illustrated a camera 12 incorporating one form of the film advancing apparatus of the invention. Camera 12 is adapted to be employed with a film assemblage or pack of the type including a container 36, provided with an exposure aperture 58 in forward wall 59 and a film withdrawal opening 38 which extends substantially the width of the pack 36.

Positioned within container 36 are a plurality of stacked film units 35, only two of which are shown, having their photosensitive surfaces facing exposure aperture 58. Film units 35 are preferably of the type shown and described in detail in the U.S. patent application of Edwin H. Land, Ser. No. 622,287 and Edwin H. Land et al., Ser. No. 622,286, both filed Mar. 10, 1967. Film units of this type each incorporates all of the materials necessary to produce a positive photographic print including a photosensitive element 44, a second or image-receiving element 46 which is transparent and is secured in face-to-face relation with the photosensitive element, and a rupturable pod 48 of processing liquid secured to one end of the photosensitive and second elements for dispensing its liquid contents therebetween in response to the application of compressive pressure to the pod 48. Each film unit is adapted to be processed by advancing the film unit, pod 48 foremost, between a pair of pressure-applying members which dispense the liquid contents of the pod therefrom between the photosensitive and second elements and spread the liquid between and in contact with the two elements toward the trailing end thereof.

Each film unit 35 is provided with one or more openings 34 formed therein near one edge thereof, said openings being adapted to receive means for moving the film unit, subsequent to exposure, from the container and into the bite of a pair of rolls as will be more clearly explained hereinafter. Any other suitable means, e.g., a series of corrugations, may be provided in the film unit for accomplishing the same purpose.

The image-forming process is well-known in the art and involves the formation of an imagewise distribution of transferably image-forming substances in the exposed photosensitive element and diffusion of the image-forming substances to another layer within the film unit where they form a visible, positive image. As described in the aforementioned applications, the processing liquid includes an opacifying agent which is spread in a layer between the photosensitive element (which is preferably opaque to actinic light), and the transparent image-receiving element 46 for providing a background for the positive transfer image and masking any image formed in the photosensitive element.

Camera size can be reduced and a higher degree of compactness achieved by eliminating the necessity for a processing or imbibition chamber in the camera into which the film unit is advanced and retained in a light-free environment during image formation. Accordingly, the film unit is designed to be advanced from the camera into the light immediately after the processing liquid is distributed within the film unit which means that spreading of the processing liquid must be effective to prevent further exposure of the photosensitive elements almost immediately as it (liquid spreading) occurs. The opacifying agent in the processing liquid functions to prevent exposure of the photosensitive element to light transmitted by the transparent second element 46 during processing outside the camera.

Film container 36 is provided with a thin elongated slot 50 which extends from a position adjacent the leading edge of the container rearwardly. Slot 50 is dimensioned to receive a film engaging means or pick as will be explained hereinafter. Container 36 is also provided with light seal and hold back member 52 made from an opaque material. Member 52 has a portion 54 which extends across opening 38 to prevent the admission of light therethrough and to prevent the withdrawal of more than one film unit at a time through opening 38. Also, biasing means 56 in the form of springs are provided for resiliently urging the film units 35 towards and in alignment with exposure aperture 58. For a more detailed description of the film container, reference is made to my copending U.S. application Ser. No. 713,648 filed on even date herewith.

Camera 12, which is of the collapsible type, is shown in FIG. 1 in its operative or extended position and is comprised of a plurality of sections 11, 13, 15, 17 pivotally connected to each other and which define four sides of a substantially light free exposure chamber 21. The other sides of the exposure chamber are closed by a pair of extensible bellows 19. Section 11 is provided with a support means in the form of a forward wall 23 which cooperates with a door 29 and a rear wall 31 to properly position the film assembly 36 containing the plurality of stacked film units 35 within the camera such that an end (forwardmost) film unit is in position for exposure. Forward wall 23 is provided with an aperture 63, similar to and in alignment with aperture 58, into which a lip 73 on container 36 protrudes. Wall 23, which extends to substantially the end of container 36 having the withdrawal slot 38, is shown partially cut away in order to more clearly show the film advancing apparatus of the instant invention. Wall 23 has a rear surface 63 which is located substantially in the focal plane of the camera. Wall 31 may be provided with suitable means, e.g., a spring or an elastomeric pad, for urging the container 36 towards support member 23. Section 17 is provided with a conventional lens and shutter assembly, the latter preferably being of the automatic type, for exposing a film unit 35 positioned for exposure within the camera housing. An interior wall of section 13 is provided with a substantially planar mirror for reflecting light from the lens towards a film unit positioned for exposure in section 11.

The camera includes a pair of pressure-applying members or rolls 24, 26 mounted in juxtaposition within section 11 and a motor 61 for driving the rolls mounted in section 17. The rolls 24, 26 are adapted to receive a film unit, subsequent to exposure, in their bite and apply sufficient pressure to break the pod 48 and evenly distribute the processing liquid within the pod between the sheets 44, 46 to produce a positive photographic print. For a more detailed description of the camera, reference is made to the copending U.S. patent application of Land et al., Ser. No. 655,850, filed July 25, 1967.

Heretofore, means such as friction wheels were provided for moving a sheet of material from a container into the bite of a pair of juxtaposed rolls. When it was desired to obtain a sheet of the material, a switch was actuated to connect the friction wheel with a source of power. Once connected to the source of power the friction wheel would rotate to move the sheet from the container into the bite of the rolls and then the cycle would be completed by disconnecting the friction wheel from the power source. Should the friction wheel fail to move the sheet from the container, the operator of the machine merely had to start the cycle again and the only loss involved would be time. However, in photographic apparatus such as a camera, the means for moving an exposed film unit from the film container into the bite of the rolls must not only be simple and compact but also dependable. Should the means for moving the film unit from the container fail, there will be a loss of more than time. Failure to move the film unit, subsequent to exposure, from the container into the bite of the rolls will result in the loss of at least two film units should the user of the camera have to open the camera in order to manually remove the exposed film unit thereby double exposing that film unit and exposing the next film unit in the camera.

In a preferred embodiment of the apparatus, the film-feeding operation is an intermediate step in an exposure and processing cycle, thus making it important that the means for moving a film unit from the container be of a type which will operate continuously until a film unit has been fed into the bite of the rolls and thereby avoid the necessity for repeating the cycle, particularly the exposure step. Continuous operation of the means for moving the film during a processing cycle means that it may be possible to move a second film unit from exposure position toward the bite of the rolls before processing of the preceding film unit is complete Accordingly, means are provided for disenabling the film moving means to move a film unit within the container whenever a film unit is engaged between the processing rollers. Additionally, it may be desirable to provide disenabling means of this type adapted to prevent movement of a succeeding film unit from the container until the preceding film unit has been advanced a predetermined distance beyond the rolls, thus allowing time for the processing cycle to be terminated prior to movement of the succeeding film unit which should occur only after the exposure which initiates the next exposure and processing cycle. I have invented such a means and it is disclosed and identified herein generally by reference character 10.

Film advancing apparatus 10 is comprised of a T-shaped member 14 having, as viewed in FIG. 2, a pair of slots 16 which are parallel with the direction of movement of a film unit 35 from the container towards the rolls and a slot 18 which is transverse to slots 16. T-shaped member 14 is attached to the camera structure by a pair of pins 20, each of which extends into one of the slots 16. A pin 22, which is mounted eccentrically upon an end of drive gear 25, extends into slot 18 for imparting reciprocating motion to T-shaped member 14. An arm 28, having a pick or film engaging member 30 at one end thereof and a disenabling or film sensing member 32 at the other end thereof, is pivotally coupled by pin 37 to the T-shaped member 14. Gear 25, which is counted coaxially with one of the rolls 24, 26 of a film transport means, cooperates with a gear on the end of the other roll to insure that the rolls 24, 26 are driven at substantially the same speed and the gears are connected via a gear train (not shown) to a motor 61. By providing the camera 12 with power driven rolls 24, 26, the film units are advanced by the rolls at a constant speed thereby obviating the problems associated with manual movement of the film unit, e.g., a non-constant pull on the film unit can provide for non-uniform spreading of the processing liquid thereby adversely affecting the quality of the positive print.

Film engaging member 30 is mounted for movement into engagement with a portion of a film unit 35 by way of openings 34 formed near one edge of each of the film units, so as to withdraw the film unit from container 36 via opening 38 as will be more fully explained hereinafter. As shown in FIG. 2a, film engaging means 30 is connected with arm 28 by an offset portion 29.

At the other end of arm 28 there is located a disenabling means in the form of a ramp or inclined member 32 which extends perpendicularly from a downwardly extending portion 33 of arm 28. Ramp 32 extends across and into the path of movement of a film unit 35 moving between film transport means or rolls 24, 26.

The operation of the film advancing apparatus shown in FIGS. 1 and 2 and 2a will now be described. Upon actuation of the shutter button, the forwardmost film unit 35 is exposed via actinic light entering exposure aperture 58. Subsequent to the tripping of the shutter switch or button, a source of energy, e.g., motor 61, is connected via a gear train to gear 25 to drive rolls 24, 26 in the direction shown by the arrows. Rotating roll 24 in a clockwise manner, as viewed in FIG. 2, will cause pin 22 to reciprocate in slot 18. Movement of pin 22 within slot 18 will cause T-shaped member 14 to reciprocate towards and away from container 36. Arm 28, which is pivotally coupled to member 14, is slightly biased about pin 37 in a clockwise manner by spring means 60 such that film engaging portion 30 is resiliently urged into contact with the forwardmost film unit 35 in container 36. Reciprocating movement of T-shaped member 14 causes arm 28 to reciprocate back and forth and since film engaging portion 30 is biased into one of the openings 34 on film unit 35, the film unit will be withdrawn from the container 36 via opening 38. Should member 30 fail to enter one of the openings 34 on the first stroke, continued operation of the arm 28 will provide the desired number of opportunities for such entry and engagement. Film engaging member 30 continues to move film unit 35 from the container unit the leading edge of the film unit is located between the pressure-applying members 24, 26. This may only take one or more strokes by film engaging member 30, the number of strokes being a function of the diameter of the circle described by the rotating pin 22 and the distance between the leading edge of the film unit in the container and the bite of the rolls. Movement of the film unit through the rolls 24, 26 causes pod 48 to rupture and the rolls spread the processing liquid between the layers 44 and 46. The film unit 35 continues to be transported through the camera at a constant speed by rolls 24, 26 until ramp 32 is contacted and moved by the film unit. Once the film unit contacts and moves ramp 32, a movement is created about the axis of pin 37 such that arm 28 is pivoted in a counterclockwise manner, i.e., against the bias of spring 60, to cause film engaging portion 30 to be raised to the dotted line position shown in FIG. 2 wherein, although it is still reciprocating, it is incapable of removing another film unit until the first film unit has passed from contact with ramp 32 and arm 28 allowed to resume the full line position. After the film unit 35 passes ramp 32, it exits from the camera by way of a slot 71 in member 17. Any suitable means may be provided for disconnecting the source of energy from driving the rolls 24, 26. It should be noted that the number of openings on each film unit is just sufficient to allow the film engaging means 30 to advance the leading edge of the film unit into the bite of the rolls 24, 26. Also, film engaging portion 30 is inclined downwardly and forwardly so that it will move the film unit on the forward stroke but will ride up out of the opening 34 and enter a more rearward opening on the back stroke, i.e., to the right as viewed in FIG. 2. Once the film unit is in the bite of the rolls, the rolls advance the film unit at a constant speed thereby giving an even distribution of the processing liquid between the photosensitive and image-receiving elements.

Reference is now made to FIG. 3 of the drawings wherein is shown a modified type of film advancing apparatus, generally designated by reference numeral 100. Here, as in the embodiment shown in FIG. 1, the rolls 24, 26 have attached thereto at their ends gears 25 and the rolls and gears are supported at their ends by support members 27. As shown, one of the gears 25 is provided with an eccentrically mounted pin 22 which extends into an elongated slot 18 in lever 102. Suitably attached to the lower end of lever 102 is a disenabling means or sensing member 104 which extends into the path of travel of a film unit through the camera, similar to sensing member 32 shown in FIG. 1. Extending from an intermediate portion of lever 102 is an arm 106 having an inwardly directed portion 108. Mounted above container 36 is an arm 110, one end of which is pivotally connected at 112 to the camera 12. Spring means 114 are provided for resiliently biasing arm 110 in a clockwise direction as viewed in FIG. 3. Stop means 109 which may be provided on the camera structure or on container 36 limit the rearward movement of arm 110. The other end of arm 110 is provided with a downturned film engaging member 116 and an upturned film engaging member 116 and an upturned section 118. Member 116 extends into opening 50 in the top of container 36 and into one of the openings 34 near the edge of film unit 35. Member 118 is positioned in the path of travel of inwardly extending portion 108 such that when arm 106 is moving to the right, as viewed in FIG. 3, portion 108 contacts the upturned section 118 thereby causing arm 110 to rotate about pivot 112 in a counterclockwise manner. This counterclockwise rotation of arm 110 enables film engaging member 116 to advance the forwardmost film unit from the container towards the bite of rolls 24, 26. As the film unit is transported through the camera by rolls 24, 26, the leading edge of the film unit, as it emerges from the rolls, will contact and move sensing member 104 which is located in its path of movement. Once the sensing member is contacted and moved by the film unit, it (the sensing member) will cause arm 106 to pivot in a clockwise manner about pin 120 extending from arm 106. This clockwise movement will raise portion 108 to a height wherein, although it is still reciprocating, it is incapable of striking or contacting upturned section 118 thereby in effect disengaging the film engaging member 116 from the means 61 driving gears 25. Pin 120 has its outermost or free end mounted in a slot (not shown) in the camera body thereby enabling it to pivot and to move in a direction generally parallel to the movement of the film unit from the container. Suitable means, e.g., springs or weights, may be provided for urging arm 106 in a counterclockwise manner to maintain members 108 and 118 in contact with one another until sensing member 104 is contacted by a film unit. At this point, it should be noted that upturned member 118 is provided with an inclined surface 122. Should member 108 ever jump over or get to the right hand side of member 118, as viewed in FIG. 3, it can return to its proper position by riding up and over the inclined surface 122. It should be obvious that member 108 could also be provided with an inclined surface for cooperating with surface 122. Also, film engaging member 116 has an inclined surface 123 which cooperates with the openings or corrugations in the film unit to move the film unit to the right but will ride over the corrugations or out of the openings when member 116 is moved to the left.

Figure 4:
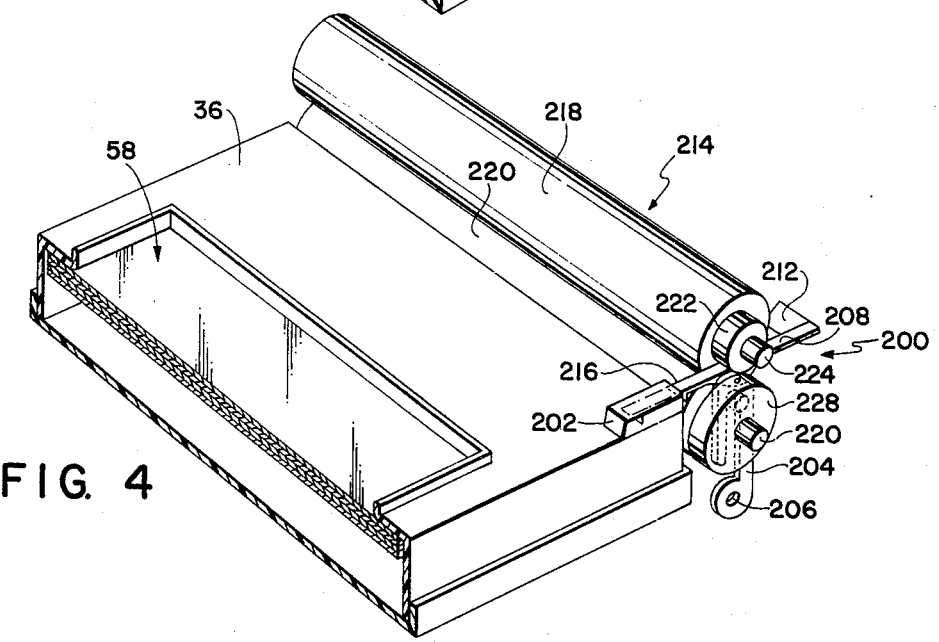
FIG. 4 is a perspective view of still another modification of the film advancing apparatus of FIG. 1 shown positioned adjacent an end of a film unit container.
Figure 5:
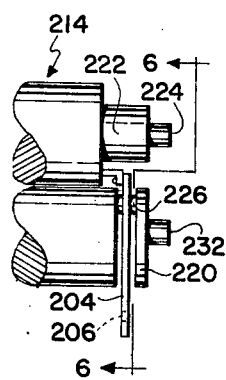
FIG. 5 is a partial side view of the connection between the film advancing apparatus of FIG. 4 and the film transport means of the camera.
Figure 6:
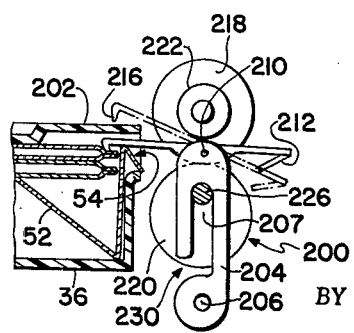
FIG. 6 is a view substantially taken along the line 6—6 of FIG. 5.

A further embodiment of a film advancing apparatus is shown in FIGS. 4–6. Here, the film advancing apparatus, generally designated by reference numeral 200, is mounted adjacent the film container 36 which is similar to the container described hereinbefore except that the opening of slot 50 has been replaced by a raised portion 202 for enabling the film advancing apparatus to withdraw the film unit by way of opening 38 as will be explained. Film advancing apparatus 200 is comprised of an arm 204 having an elongated slot 207 therein. Arm 204 is pivotally coupled at one end thereof with a part of the camera body at 206 and has a second arm 208 pivotally coupled thereto at 210. Arm 208 has an inclined surface 212 extending therefrom at one end into the path of travel of a film unit between the pressure-applying means, generally designated as 214. At its other end, arm 208 is provided with a downwardly and forwardly directed film engaging means 216.

Pressure-applying means 214 is comprised of rolls 218 and 220. Roll 218 has at one end thereof a portion 222 of reduced diameter connecting bearing means 224 with roll 218. Roll 220 is provided intermediate its ends with a portion 226 of reduced diameter. Roll 220 carries on its end face a bearing means 232. As shown, portion 226 is eccentric to the longitudinal axis of roll 220. Film advancing apparatus 200 is coupled with roll 220 by inserting portion or pin 226 into slot 207 by way of an opening 230 in slot 207 and positioning arm 208 between the rolls.

In operation, roll 220 is driven in a clockwise manner, as viewed in FIG. 4, and due to the cooperation between pin 226 and slot 207 in arm 204, arm 204 is caused to oscillate about pivot 206 to cause arm 208, which extends between the rolls, to enter opening 38 in container 36, deflect light shield 54 and enter one of the openings in film unit 35. As arm 208 now moves to the right, the film unit is withdrawn from the container via opening 38 and fed into the bite of rolls 218, 220. Rolls 218, 220, which are driven in a manner similar to that set forth in FIGS. 1–3, evenly spread the processing liquid as hereinbefore mentioned and transports the film unit away from the container. When the film unit advances to a point at which it contacts and moves sensing member 212, arm 208 is pivoted in a clockwise manner about pivot 210 to the dotted line position shown in FIG. 6. Once the arm 208 in in the dotted line position, the reciprocating motion transmitted thereto via its connection with roll 220 will merely cause arm 208 to reciprocate in a manner wherein film engaging portion 216 is out of alignment with opening 38 thereby precluding the removal of another film unit from the container 36 until the preceding film unit has passed to a point wherein it is no longer sensed by the sensing member 212. Suitable spring means (not shown) may be provided for biasing arm 208 into a plane which is in alignment with opening 38 until member 212 senses a film unit.

It may be apparent from the foregoing that other means may be used for detecting the presence of a film unit as it passes between the pressure-applying members. For example, a photoelectric cell could be used as the detecting or sensing means, the photoelectric cell upon sensing the film unit could close an electrical circuit to operate a solenoid or other suitable means for moving the film advancing means into a position wherein it cannot withdraw another film unit until the photoelectric cell no longer senses the first-mentioned film unit.

It should be obvious that the motor 61 used herein may be battery operated or it could be a manually wound spring motor.

From the foregoing, it can readily be seen that I have disclosed a novel means, which is simple, compact and dependable, for moving individual film units from a container into the bite of a pair of pressure-applying rolls and which will prevent the withdrawal from exposure position of a succeeding film unit until the preceding film unit has passed from engagement with the rolls and there has been an opportunity to expose the succeeding film unit.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus including support means for supporting a container of stacked film units with one of said film units in position for exposure, said container having an opening in one end thereof located adjacent an end of said one film unit through which said one film unit is movable subsequent to exposure, and transport means located adjacent said support means for engaging and moving said one film unit through said apparatus, comprising, in combination:

film advancing means for engaging one of said film unit within said container and moving said one film unit from said container into engagement with said transport means, said film advancing means being mounted for reciprocating movement toward and away from said transport means;

drive means for driving said transport means and said film advancing means; and disenabling means for sensing the presence of said one film unit in engagement with said transport means and coupled with said film advancing means for disenabling said film advancing means to move another of said film units into engagement with said transport means.

2. Photographic apparatus as defined in claim 1 wherein said drive means simultaneously and continuously drives said transport means and said film advancing means when said one film unit is in engagement with said transport means.

3. Photographic apparatus as defined in claim 2 wherein said film advancing means includes film engaging means, said disenabling means being coupled to said film engaging means for uncoupling said drive means from said film engaging means upon sensing the presence of said one film unit in engagemet with said transport means.

4. Photographic apparatus as defined in claim 2 wherein said transport means comprises a pair of rolls at least one of which is coupled with said drive means.

5. Photographic apparatus as defined in claim 4 wherein said film advancing means is mounted between said rolls for movement towards and away from said container.

6. Photographic apparatus as defined in claim 4 including means drivingly connecting said film advancing means directly with one of said rolls.

7. Photographic apparatus as defined in claim 1 wherein said film advancing means comprises a drive member mounted for movement toward and away from said transport means, and a lever coupled to said drive member and including film engaging means at one end, said disenabling means being coupled to said lever for moving said lever to a position wherein said film engaging means is out of contact with another film unit upon sensing by said disenabling means of a film unit in engagement with said transport means.

8. Photographic apparatus as defined in claim 1 for use with a container having an aperture therein, including spring means for biasing said film advancing means in a direction so as to extend into said aperture and into contact with said one film unit during initial movement of said one film unit from said container through said opening.

9. Photographic apparatus as defined in claim 1 wherein said film advancing means is mounted for movement toward and away from said container so as to extend through said opening for engaging and withdrawing said one film unit.

10. Photographic apparatus as defined in claim 1 wherein said film advancing means includes film engaging means and spring means biasing said film engaging means in a first direction into engagement with a film unit, said disenabling means, upon sensing the presence of a film unit in engagement with said transport means, being operative to displace said film engaging means in a direction opposite to said first direction and in opposition to the force of said spring means.

11. Photographic apparatus as defined in claim 1 wherein said film advancing means includes film engaging means for engaging and moving said one film unit, said disenabling means being coupled with said film engaging means for disenabling said film engaging means to engage and move another of said film units until at least said one film unit has been advanced from engagement with said transport means.

12. Photographic apparatus as defined in claim 1 wherein said film advancing means includes film engaging means and, said disenabling means is located to the side of said transport means opposite said film engaging means.

13. Photographic apparatus as defined in claim 12 wherein said disenabling means includes an engagement member located in the path of movement of said one film unit from said transport means.

14. Photographic apparatus as defined in claim 1 wherein said film advancing means includes film engaging means mounted for reciprocating motion and having an inclined surface for contacting without moving said one film unit during movement of said film engaging means in a direction opposite to the direction of film movement by said transport means.

15. Photographic apparatus as defined in claim 1 wherein said film advancing means and said disenabling means comprise a single member having a section located to one side of said transport means for engaging and moving said film units and a section located to the opposite side of said transport means in position to be engaged and displaced by a film unit during movement thereof in engagement with said transport means.

16. Photographic apparatus as defined in claim 1 including a housing for enclosing the components of said apparatus and having a film withdrawal opening therein, and wherein said disenabling means is located between said transport means and said film withdrawing opening.

References Cited

UNITED STATES PATENTS

| 3,316,823 | 5/1967 | Kaess et al. | 95—13 XR |
| 3,447,437 | 6/1969 | Tiffany | 95—13 |

NORTON ANSHER, Primary Examiner

R. L. MOSES, Assistant Examiner

U.S. Cl. X.R.

95—93